US012254744B2

(12) United States Patent
Amaitis et al.

(10) Patent No.: US 12,254,744 B2
(45) Date of Patent: Mar. 18, 2025

(54) SUBMISSION OF PRE-AUTHORIZED TAX-RELATED DOCUMENTS RELATING TO GAME PAYOUTS

(71) Applicant: CFPH, LLC, New York, NY (US)

(72) Inventors: Lee M. Amaitis, Las Vegas, NV (US); Howard W. Lutnick, New York, NY (US)

(73) Assignee: CFPH, LLC, New York, NY (US)

( * ) Notice: Subject to any disclaimer, the term of this patent is extended or adjusted under 35 U.S.C. 154(b) by 0 days.

(21) Appl. No.: 18/413,388

(22) Filed: Jan. 16, 2024

(65) Prior Publication Data

US 2024/0153345 A1 May 9, 2024

Related U.S. Application Data

(63) Continuation of application No. 17/876,724, filed on Jul. 29, 2022, now Pat. No. 11,908,276, which is a continuation of application No. 17/126,565, filed on Dec. 18, 2020, now Pat. No. 11,403,915, which is a continuation of application No. 16/294,204, filed on Mar. 6, 2019, now Pat. No. 10,878,659, which is a continuation of application No. 15/904,950, filed on Feb. 26, 2018, now Pat. No. 10,255,757, which is a continuation of application No. 14/584,381, filed on Dec. 29, 2014, now Pat. No. 9,905,078.

(60) Provisional application No. 61/921,409, filed on Dec. 28, 2013.

(51) Int. Cl.
*G07F 17/32* (2006.01)

(52) U.S. Cl.
CPC ...... *G07F 17/3244* (2013.01); *G07F 17/3232* (2013.01); *G07F 17/3237* (2013.01)

(58) Field of Classification Search
CPC ............ G07F 17/3244; G07F 17/3232; G07F 17/3237
USPC ........................................................ 463/25
See application file for complete search history.

(56) References Cited

U.S. PATENT DOCUMENTS

| | | | | |
|---|---|---|---|---|
| 7,670,222 | B2 | 3/2010 | Rozkin et al. | |
| 7,785,184 | B2 | 8/2010 | Jubinville et al. | |
| 8,210,931 | B2 * | 7/2012 | Alderucci | G07F 17/32 463/16 |
| 11,069,188 | B2 * | 7/2021 | Flaherty | G07F 17/3237 |
| 2004/0242315 | A1 | 12/2004 | Paulsen | |
| 2005/0261995 | A1 | 11/2005 | Phelan | |
| 2009/0069087 | A1 * | 3/2009 | Kelly | G07F 17/3267 463/25 |
| 2016/0292964 | A1 * | 10/2016 | Flaherty | G07F 17/3244 |

FOREIGN PATENT DOCUMENTS

| | | |
|---|---|---|
| CN | 101180106 | 5/2008 |
| CN | 101203282 | 6/2008 |
| CN | 201832396 | 5/2011 |

* cited by examiner

*Primary Examiner* — Pierre E Elisca

(57) ABSTRACT

Methods, apparatuses, and computer-readable media for submitting a tax submission on behalf of a player of a game. Based on the location of the gaming device, determine at least one jurisdiction that governs the player's taxable winnings. The player fills out an electronic tax form for each jurisdiction and submits an electronic authorization. Transmitting, in response to the tax liability, a tax submission to a remote device, in which the tax submission comprises at least the electronic tax form and the electronic authorization.

11 Claims, 2 Drawing Sheets

SUBMISSION OF PRE-AUTHORIZED TAX-RELATED DOCUMENTS RELATING TO GAME PAYOUTS

CROSS-REFERENCE TO RELATED APPLICATIONS

This application is a continuation of U.S. patent application Ser. No. 17/876,724 filed Jul. 29, 2022, which is a continuation of U.S. patent application Ser. No. 16/294,204 filed Mar. 6, 2019 (now U.S. Pat. No. 10,878,659 issued Dec. 29, 2020), which is a continuation of U.S. patent application Ser. No. 15/904,950 filed Feb. 26, 2018 (now U.S. Pat. No. 10,255,757 issued Apr. 9, 2019), which is a continuation of U.S. patent application Ser. No. 14/584,381 filed Dec. 29, 2014 (now U.S. Pat. No. 9,905,078 issued Feb. 27, 2018), which claims the benefit of U.S. Provisional Application No. 61/921,409 filed Dec. 28, 2013, each of which is incorporated by reference herein in its entirety.

BACKGROUND

The invention relates to the submission of tax forms during gaming transactions.

DETAILED DESCRIPTION

In games involving high stake slot machines, whenever a player hits a jackpot that is over a certain limit, the machine has to stop, and the player needs to sign a tax reporting form (paper) in order to keep playing. This also affects how much of the jackpot the player may receive at that time. After the player signs the tax reporting form, an attendant resets the machine, and the player returns to playing on the machine. It is desirable to have a system that automates the submission of the tax reporting forms.

In such instances, before a player ever begins playing, the player authorizes (e.g., signs their name) to a tax reporting form (paper). In some instances, the authorization is required at several locations on the tax reporting paper. The player may sign several copies of the tax forms in advance. Each signature represents the person having signed off for each taxable event that may subsequently occur at the machine. Hence, if person hits certain jackpot, he has already signed, and an attendant only needs to reset the machine. In such a scenario, the player may hit a certain number of jackpots without having to sign the form.

Figure 1:
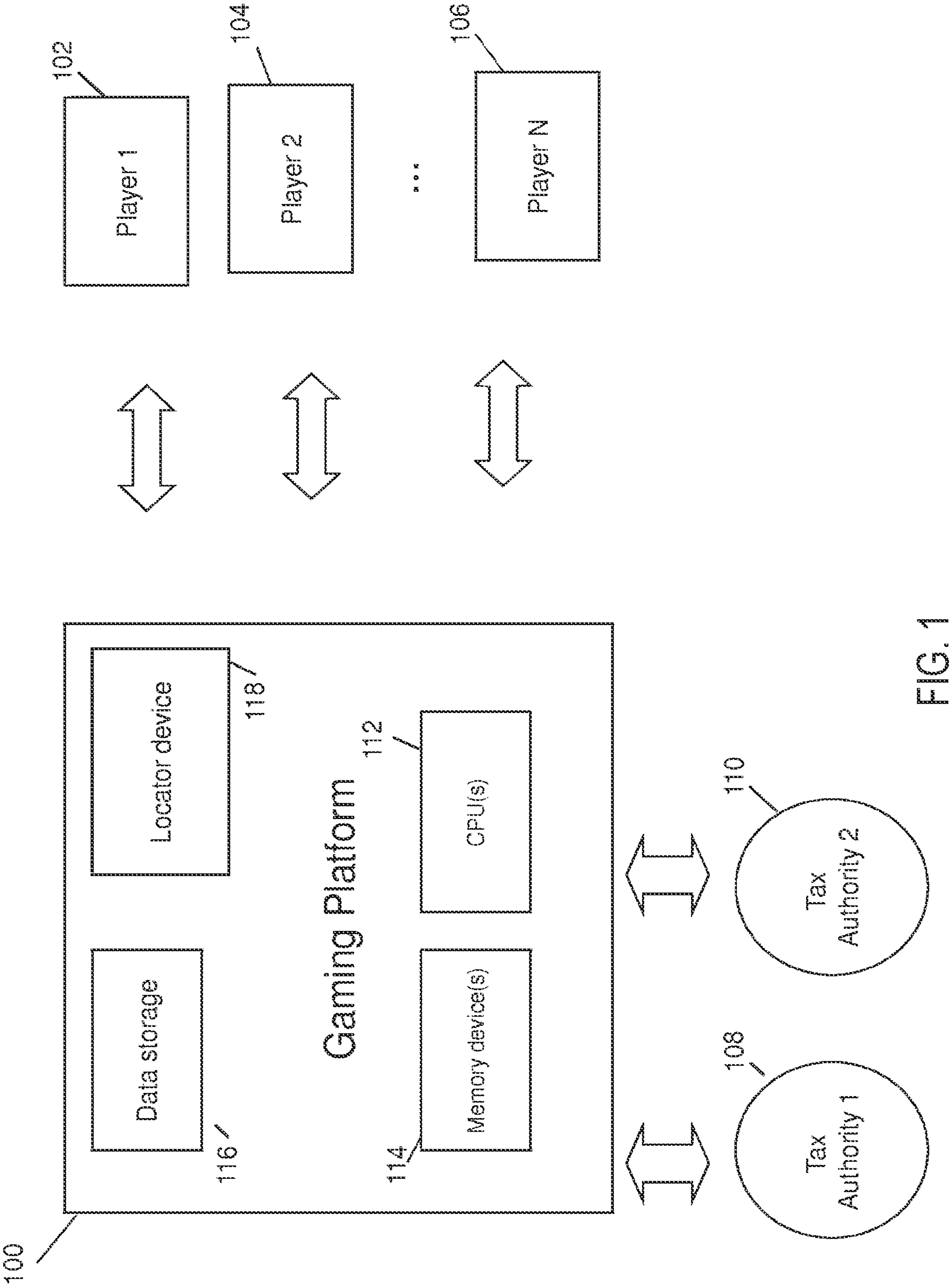
FIG. 1 is an illustrative gaming system in accordance with aspects of the present disclosure.

Referring to FIG. 1, gaming system 100 is in communication with one or more player gaming devices 102-106. Gaming system 100 is also in communication with one or more tax authorities 108-110, which govern the tax liabilities on any winnings won by player gaming devices 102-106. In one embodiment, gaming system 100 comprises CPU(s) 112, memory devices 114, data storage 116 and locator device 118. In one embodiment, locator device 118 may be used to track the location of a player device 102-106, in order to determine the tax jurisdiction that applies.

Figure 2:
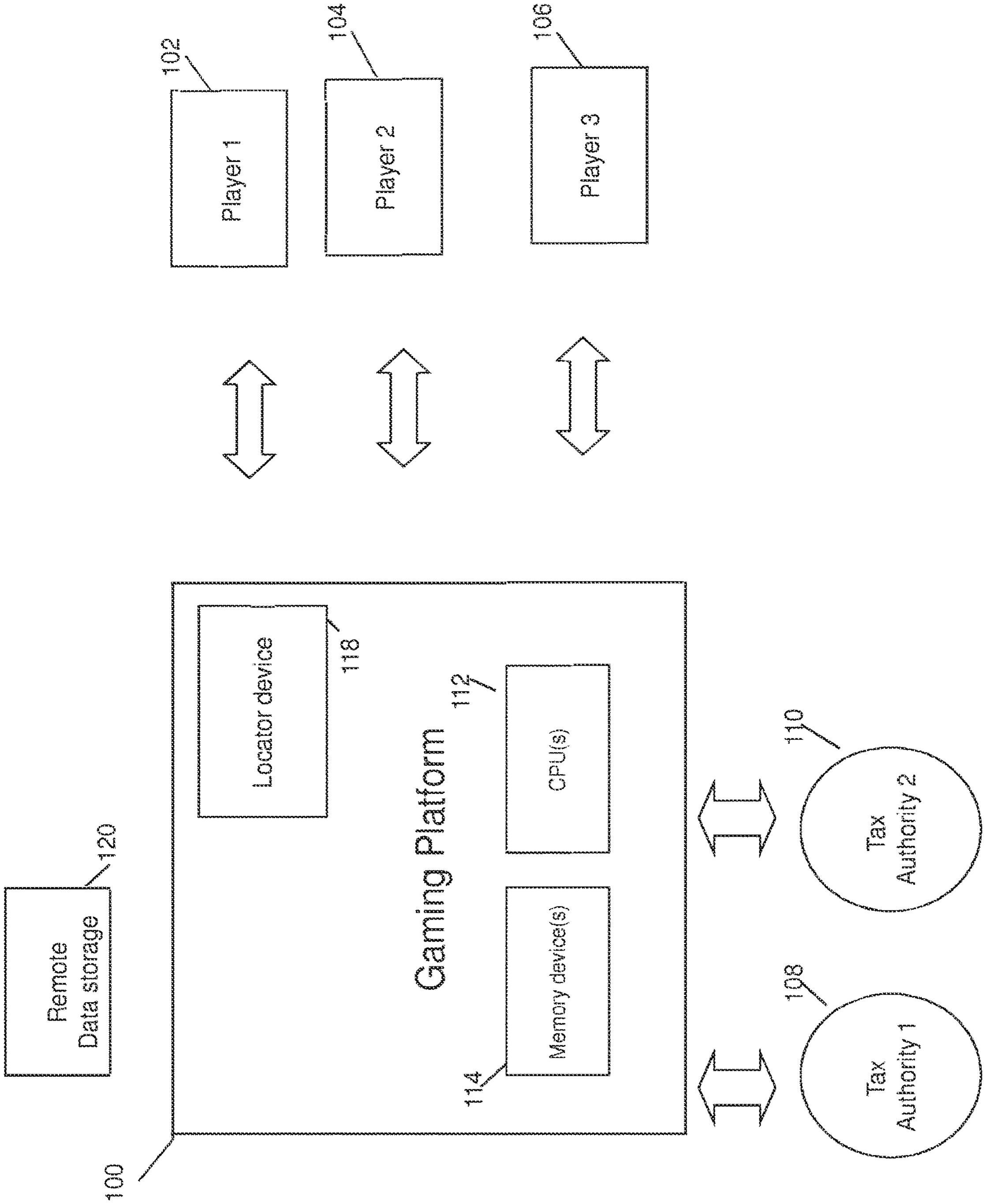
FIG. 2, is another illustrative gaming system in accordance with aspects of the present disclosure.

As shown in FIG. 2, in another embodiment, data storage 120 is located remotely to gaming system 100. In another embodiment, gaming system 100 is located within each of player gaming devices 102-106. Gaming system 100 may be embedded in a wireless mobile device, such as a smartphone. Gaming system 100 also may be embedded in a wearable mobile device, such as a Google watch. Gaming system 100 also may be voice-activated by the player.

In one embodiment, the player, upon sitting at the machine, may sign in and enter a pin or some form of electronic signature. This pin/signature may be the "same" as having written his name on the session form. In addition, he may indicate that he is providing his signature for a certain number of games. In another embodiment, the player may provide his signature for a specific length of time. For example, if the player is in Las Vegas for a weekend bachelor party, he may specify that his signature is valid for any games played that weekend. The system may have a default number to use for either the certain number of games or the specific length of time.

In one embodiment, the player plays the game, when he hits a taxable event, the machine automatically records the event with the pin. For example, the pin may be used to execute the tax form. The machine then automatically submits the tax form on behalf of the player. The machine also may deduct the corresponding tax liability from the player's winnings. The player does not need to stop playing. Once the player has surpassed a certain number of games or the specific length of time has expired, the system may prompt the player to re-authorize his authorization on the tax forms.

In one embodiment, the system receives a request from a player to play a game on a gaming device. The system determines an identity of the player and a location of the gaming device. The system also determines whether the player has an authorization profile. Based on the location of the gaming device, the system determines at least one jurisdiction that governs the player's taxable winnings.

In one embodiment, the system requests that the player fill out an electronic tax form for each jurisdiction. The system obtains an electronic authorization from the player. The system determines, based on the player's winnings, that the player has a tax liability.

In one embodiment, the system transmits, in response to the tax liability, a tax submission to a remote device. The tax submission comprises at least the electronic tax form and the electronic authorization.

In one embodiment, the system receives an indication that the electronic authorization is valid for a period of time.

In one embodiment, the system receives an indication that the electronic authorization is valid for a quantity of games played by the player.

In one embodiment, the system receives an indication that the electronic authorization is valid for a quantity of tax submissions.

In one embodiment, the system receives an indication that the electronic authorization is valid up to a total tax liability amount, in which the total tax liability amount is determined in advance of receiving the request from the player.

In one embodiment, the system receives an indication that the electronic authorization is valid for a type of game.

In one embodiment, the system generates an authorization profile for the player, in which the authorization profile comprises the electronic authorization for at least one jurisdiction.

In one embodiment, the system obtains the electronic authorization of the player by receiving an electronic signature. In another embodiment, the system obtains the electronic authorization of the player by receiving biometric data of the player. In one embodiment, the system obtains the electronic authorization of the player by performing a retinal scan on the player. In one embodiment, the system obtains the electronic authorization of the player by performing a facial scan on the player. In one embodiment, the system obtains the electronic authorization of the player by performing a fingerprint scan on the player.

In one embodiment, the system requests that the player fill out at least one tax form for each relevant jurisdiction.

In one embodiment, the system monitors the game for an amount of the player's winnings.

In one embodiment, the system determines whether the amount of the player's winnings exceeds a taxable threshold for the at least one jurisdiction. In one embodiment, the taxable threshold varies depending on the jurisdiction. In one embodiment, the taxable threshold is an amount that is determined by the location of the player.

In one embodiment, the electronic tax form and the electronic authorization are transmitted automatically without player input. In one embodiment, a notification is transmitted to the player that the tax submission has been transmitted.

In one embodiment, the system awards the player with a payout that comprises the player's winnings less the tax liability. In one embodiment, the system stores the player's winnings as credits. In one embodiment, the credits may be redeemable for playing future games. In another embodiment, the credits may be converted into cash. In one embodiment, the system prints a voucher that is redeemable at a cashier location in an amount of the player's winnings.

In one embodiment, the system receives a request to modify the electronic authorization from the player. In one embodiment, the request to modify further includes canceling the electronic authorization for the game. In another embodiment, the request to modify includes adjusting the period of time in which the electronic authorization is valid. In another embodiment, the request to modify includes adjusting the quantity of games in which the electronic authorization is valid. In another embodiment, the request to modify further includes adjusting the quantity of tax submissions in which the electronic authorization is valid.

In one embodiment, the system receives an indication that the electronic authorization is valid for a period of time.

In one embodiment, the system determines that the electronic authorization is no longer valid. In one embodiment, the system transmits an indication to the player that the electronic authorization is no longer valid. In one embodiment, the system transmits a request for the player to submit an updated electronic authorization.

In one embodiment, the system verifies that the electronic tax form is up-to-date. In one embodiment, the system updates the electronic tax form to reflect any changes within the at least one jurisdiction.

In one embodiment, the gaming device is a PDA or some other mobile gaming device. In one embodiment, the gaming device is Google Glasses™. In one embodiment, the gaming device is a stationary kiosk or slot machine.

Additional Embodiments

A method comprising: receiving a request from the player to play the game on a gaming device; determining an identity of the player and a location of the gaming device; determining whether the player has an authorization profile; based on the location of the gaming device, determining at least one jurisdiction that governs the player's taxable winnings; requesting that the player fill out an electronic tax form for each jurisdiction; obtaining an electronic authorization from the player; determining, based on the player's winnings, that the player has a tax liability; transmitting, in response to the tax liability, the tax submission to a remote device, in which the tax submission comprises at least the electronic tax form and the electronic authorization, in which the remote device and the processor are in electronic communication over a network.

A.1. The method of claim A further comprising: receiving an indication that the electronic authorization is valid for a period of time. A.2. The method of claim A further comprising: receiving an indication that the electronic authorization is valid for a quantity of games played by the player. A.3. The method of claim A further comprising: receiving an indication that the electronic authorization is valid for a quantity of tax submissions from the player. A.4. The method of claim A further comprising: receiving an indication that the electronic authorization is valid for a maximum tax liability amount, in which the maximum tax liability amount is determined in advance of receiving the request from the player. A.5. The method of claim A further comprising: receiving an indication that the electronic authorization is valid for a type of game.

A.6. The method of claim A further comprising: generating the authorization profile for the player, in which the authorization profile comprises the electronic authorization for at least one jurisdiction that is relevant to the player. A.7. The method of claim A, in which obtaining the electronic authorization of the player comprises: receiving an electronic signature. A.8. The method of claim A, in which obtaining the electronic authorization comprises: receiving biometric data of the player. A.9. The method of claim A, in which obtaining the electronic authorization of the player comprises: performing a retinal scan on the player. A.10. The method of claim A, in which obtaining the electronic authorization of the player comprises: performing a facial scan on the player. A.11. The method of claim A, in which obtaining the electronic authorization of the player comprises: performing a fingerprint scan on the player.

A.12. The method of claim A further comprising: requesting that the player fill out at least one tax form for each jurisdiction that is relevant to the player. A.13. The method of claim A further comprising: monitoring an amount of the player's winnings for each game. A.13.1. The method of claim A.13 further comprising: determining whether the amount of the player's winnings exceeds a taxable threshold for the at least one jurisdiction. A.13.1.1. The method of claim A.13.1., in which the taxable threshold varies depending on the at least one jurisdiction. A.13.1.2. The method of claim A.13.1., in which the taxable threshold is an amount that is determined by the location of the player.

A.14. The method of claim A, in which the gaming device is a mobile gaming device. A.14.1. The method of claim A.14., in which the mobile gaming device is wearable by the player. A.14.2. The method of claim A.14., in which the mobile gaming device is voice-activated by the player. A.14.3. The method of claim A.14., in which the mobile gaming device is a hands-free device.

A.15. The method of claim A, in which transmitting the electronic tax form and transmitting the electronic authorization are performed on behalf of the player. A.15.1. The method of claim A.15, in which a prompt is transmitted to the player, in which the prompt requests the player's approval before transmitting the electronic tax form and transmitting the electronic authorization. A.15.2. The method of claim A.15, in which the electronic tax form and the electronic authorization are transmitted automatically without the player's input.

A.16. The method of claim A further comprising: transmitting a notification to the player that the tax submission has been transmitted. A.17. The method of claim A further comprising: awarding the player with a payout that comprises the player's winnings less the tax liability. A.17.1. The method of claim A.17, further comprising: storing the player's winnings as credits. A.17.1.1. The method of claim A.17.1., in which the credits are redeemable for playing future games. A.17.1.2. The method of claim A.17.1., in which the credits are converted into cash. A.17.2. The method of claim A.17. further comprising: printing a voucher that is redeemable at a cashier location in an amount of the player's winnings.

A.18. The method of claim A further comprising: receiving a request to modify the electronic authorization from the player. A.18.1. The method of claim A.18, in which the request to modify further comprises: canceling the electronic authorization for the game. A.18.2. The method of claim A.18, in which the request to modify further comprises: adjusting a period of time in which the electronic authorization is valid. A.18.3. The method of claim A.18, in which the request to modify further comprises: adjusting a quantity of games in which the electronic authorization is valid. A.18.4. The method of claim A.18, in which the request to modify further comprises: adjusting a quantity of tax submissions in which the electronic authorization is valid. A.18.5. The method of claim A.18, in which the request to modify further comprises: adjusting a maximum tax liability amount in which the electronic authorization is valid. A.18.6. The method of claim A.18., in which the request to modify further comprises: adjusting a type of game that the electronic authorization is valid.

A.19. The method of claim A further comprising: determining that the electronic authorization is no longer valid. A.19.1. The method of claim A.19 further comprising: transmitting an indication to the player that the electronic authorization is no longer valid. A.19.1.1. The method of claim A.19.1., further comprising: receiving an updated electronic authorization from the player. A.19.2. The method of claim A.19 further comprising: transmitting a request for the player to submit an updated electronic authorization. A.19.2.1. The method of claim A.19.2. further comprising: receiving an updated electronic authorization from the player.

A.20. The method of claim A further comprising: verifying that the electronic tax form is up-to-date. A.21. The method of claim A further comprising: updating the electronic tax form to reflect any changes within the at least one jurisdiction. A.22. The method of claim A, in which the tax submission to transmitted to a tax authority that corresponds to the at least one jurisdiction.

B. An apparatus comprising: a processor; and a memory, in which the memory stores instructions which, when executed by the processor, direct the processor to: receive a request from the player to play the game on a gaming device; determine an identity of the player and a location of the gaming device; determine whether the player has an authorization profile; based on the location of the gaming device, determine at least one jurisdiction that governs the player's taxable winnings; request that the player fill out an electronic tax form for each jurisdiction; obtain an electronic authorization from the player; determine, based on the player's winnings, that the player has a tax liability; transmit, in response to the tax liability, the tax submission to a remote device, in which the tax submission comprises at least the electronic tax form and the electronic authorization, in which the remote device and the processor are in electronic communication over a network.

B.1. The apparatus of claim B, in which the memory stores instructions which, when executed by the processor, direct the processor to: receive an indication that the electronic authorization is valid for a period of time. B.2. The apparatus of claim B, in which the memory stores instructions which, when executed by the processor, direct the processor to: receive an indication that the electronic authorization is valid for a quantity of games played by the player. B.3. The apparatus of claim B, in which the memory stores instructions which, when executed by the processor, direct the processor to: receive an indication that the electronic authorization is valid for a quantity of tax submissions from the player. B.4. The apparatus of claim B, in which the memory stores instructions which, when executed by the processor, direct the processor to: receive an indication that the electronic authorization is valid for a maximum tax liability amount, in which the maximum tax liability amount is determined in advance of receiving the request from the player. B.5. The apparatus of claim B, in which the memory stores instructions which, when executed by the processor, direct the processor to: receive an indication that the electronic authorization is valid for a type of game.

B.6. The apparatus of claim B, in which the memory stores instructions which, when executed by the processor, direct the processor to: generate the authorization profile for the player, in which the authorization profile comprises the electronic authorization for at least one jurisdiction that is relevant to the player. B.7. The apparatus of claim B, in which obtaining the electronic authorization of the player comprises: receiving an electronic signature. B.8. The apparatus of claim B, in which obtaining the electronic authorization comprises: receiving biometric data of the player. B.9. The apparatus of claim B, in which obtaining the electronic authorization of the player comprises: performing a retinal scan on the player. B.10. The apparatus of claim B, in which obtaining the electronic authorization of the player comprises: performing a facial scan on the player. B.11. The apparatus of claim B, in which obtaining the electronic authorization of the player comprises: performing a fingerprint scan on the player.

B.12. The apparatus of claim B, in which the memory stores instructions which, when executed by the processor, direct the processor to: request that the player fill out at least one tax form for each jurisdiction that is relevant to the player. B.13. The apparatus of claim B, in which the memory stores instructions which, when executed by the processor, direct the processor to: monitor an amount of the player's winnings for each game. B.13.1. The apparatus of claim B.13, in which the memory stores instructions which, when executed by the processor, direct the processor to: determine whether the amount of the player's winnings exceeds a taxable threshold for the at least one jurisdiction. B.13.1.1. The apparatus of claim B.13.1., in which the taxable threshold varies depending on the at least one jurisdiction. B.13.1.2. The apparatus of claim B.13.1., in which the taxable threshold is an amount that is determined by the location of the player.

B.14. The apparatus of claim B, in which the gaming device is a mobile gaming device. B.14.1. The apparatus of claim B.14., in which the mobile gaming device is wearable by the player. B.14.2. The apparatus of claim B.14., in which the mobile gaming device is voice-activated by the player. B.14.3. The apparatus of claim B.14., in which the mobile gaming device is a hands-free device.

B.15. The apparatus of claim B, in which transmitting the electronic tax form and transmitting the electronic authorization are performed on behalf of the player. B.15.1. The apparatus of claim B.15, in which a prompt is transmitted to the player, in which the prompt requests the player's approval before transmitting the electronic tax form and transmitting the electronic authorization. B.15.2. The apparatus of claim B.15, in which the electronic tax form and the electronic authorization are transmitted automatically without the player's input.

B.16. The apparatus of claim B, in which the memory stores instructions which, when executed by the processor, direct the processor to: transmit a notification to the player that the tax submission has been transmitted. B.17. The apparatus of claim B, in which the memory stores instructions which, when executed by the processor, direct the processor to: award the player with a payout that comprises the player's winnings less the tax liability. B.17.1. The apparatus of claim B.17., in which the memory stores instructions which, when executed by the processor, direct the processor to: store the player's winnings as credits. B.17.1.1. The apparatus of claim B.17.1., in which the credits are redeemable for playing future games. B.17.1.2. The apparatus of claim B.17.1., in which the credits are converted into cash. B.17.2. The apparatus of claim B.17., in which the memory stores instructions which, when executed by the processor, direct the processor to: print a voucher that is redeemable at a cashier location in an amount of the player's winnings.

B.18. The apparatus of claim B, in which the memory stores instructions which, when executed by the processor, direct the processor to: receive a request to modify the electronic authorization from the player. B.18.1. The apparatus of claim B.18, in which the request to modify further comprises: canceling the electronic authorization for the game. B.18.2. The apparatus of claim B.18, in which the request to modify further comprises: adjusting a period of time in which the electronic authorization is valid. B.18.3. The apparatus of claim B.18, in which the request to modify further comprises: adjusting a quantity of games in which the electronic authorization is valid. B.18.4. The apparatus of claim B.18, in which the request to modify further comprises: adjusting a quantity of tax submissions in which the electronic authorization is valid. B.18.5. The apparatus of claim B.18, in which the request to modify further comprises: adjusting a maximum tax liability amount in which the electronic authorization is valid. B.18.6. The apparatus of claim B.18., in which the request to modify further comprises: adjusting a type of game that the electronic authorization is valid.

B.19. The apparatus of claim B, in which the memory stores instructions which, when executed by the processor, direct the processor to: determine that the electronic authorization is no longer valid. B.19.1. The apparatus of claim B.19, in which the memory stores instructions which, when executed by the processor, direct the processor to: transmit an indication to the player that the electronic authorization is no longer valid. B.19.1.1. The apparatus of claim B.19.1., in which the memory stores instructions which, when executed by the processor, direct the processor to: receive an updated electronic authorization from the player. B.19.2. The apparatus of claim B.19, in which the memory stores instructions which, when executed by the processor, direct the processor to: transmit a request for the player to submit an updated electronic authorization. B.19.2.1. The apparatus of claim B.19.2., in which the memory stores instructions which, when executed by the processor, direct the processor to: receive an updated electronic authorization from the player.

B.20. The apparatus of claim B, in which the memory stores instructions which, when executed by the processor, direct the processor to: verify that the electronic tax form is up-to-date. B.21. The apparatus of claim B, in which the memory stores instructions which, when executed by the processor, direct the processor to: update the electronic tax form to reflect any changes within the at least one jurisdiction. B.22. The apparatus of claim B, in which the tax submission to transmitted to a tax authority that corresponds to the at least one jurisdiction.

C. An article of manufacture comprising: a tangible, non-transitory computer-readable medium, in which the tangible, non-transitory computer-readable medium stores instructions which, when executed by a processor, direct the processor to: receive a request from the player to play the game on a gaming device; determine an identity of the player and a location of the gaming device; determine whether the player has an authorization profile; based on the location of the gaming device, determine at least one jurisdiction that governs the player's taxable winnings; request that the player fill out an electronic tax form for each jurisdiction; obtain an electronic authorization from the player; determine, based on the player's winnings, that the player has a tax liability; transmit, in response to the tax liability, the tax submission to a remote device, in which the tax submission comprises at least the electronic tax form and the electronic authorization, in which the remote device and the processor are in electronic communication over a network.

C.1. The article of manufacture of claim C, in which the tangible, non-transitory computer-readable medium stores instructions which, when executed by the processor, direct the processor to: receive an indication that the electronic authorization is valid for a period of time. C.2. The article of manufacture of claim C, in which the tangible, non-transitory computer-readable medium stores instructions which, when executed by the processor, direct the processor to: receive an indication that the electronic authorization is valid for a quantity of games played by the player. C.3. The article of manufacture of claim C, in which the tangible, non-transitory computer-readable medium stores instructions which, when executed by the processor, direct the processor to: receive an indication that the electronic authorization is valid for a quantity of tax submissions from the player. C.4. The article of manufacture of claim C, in which the tangible, non-transitory computer-readable medium stores instructions which, when executed by the processor, direct the processor to: receive an indication that the electronic authorization is valid for a maximum tax liability amount, in which the maximum tax liability amount is determined in advance of receiving the request from the player. C.5. The article of manufacture of claim C, in which the tangible, non-transitory computer-readable medium stores instructions which, when executed by the processor, direct the processor to: receive an indication that the electronic authorization is valid for a type of game.

C.6. The article of manufacture of claim C, in which the tangible, non-transitory computer-readable medium stores instructions which, when executed by the processor, direct the processor to: generate the authorization profile for the player, in which the authorization profile comprises the electronic authorization for at least one jurisdiction that is relevant to the player. C.7. The article of manufacture of claim C, in which obtaining the electronic authorization of the player comprises: receiving an electronic signature. C.8. The article of manufacture of claim C, in which obtaining the electronic authorization comprises: receiving biometric data of the player. C.9. The article of manufacture of claim C, in which obtaining the electronic authorization of the player comprises: performing a retinal scan on the player. C.10. The article of manufacture of claim C, in which obtaining the electronic authorization of the player comprises: performing a facial scan on the player. C.11. The article of manufacture of claim C, in which obtaining the electronic authorization of the player comprises: performing a fingerprint scan on the player.

C.12. The article of manufacture of claim C, in which the tangible, non-transitory computer-readable medium stores instructions which, when executed by the processor, direct the processor to: request that the player fill out at least one tax form for each jurisdiction that is relevant to the player. C.13. The article of manufacture of claim C, in which the tangible, non-transitory computer-readable medium stores instructions which, when executed by the processor, direct the processor to: monitor an amount of the player's winnings for each game. C.13.1. The article of manufacture of claim C.13, in which the tangible, non-transitory computer-readable medium stores instructions which, when executed by the processor, direct the processor to: determine whether the amount of the player's winnings exceeds a taxable threshold for the at least one jurisdiction. C.13.1.1. The article of manufacture of claim C.13.1., in which the taxable threshold varies depending on the at least one jurisdiction. C.13.1.2. The article of manufacture of claim C.13.1., in which the taxable threshold is an amount that is determined by the location of the player.

C.14. The article of manufacture of claim C, in which the gaming device is a mobile gaming device. C.14.1. The article of manufacture of claim C.14., in which the mobile gaming device is wearable by the player. C.14.2. The article of manufacture of claim C.14, in which the mobile gaming device is voice-activated by the player. C.14.3. The article of manufacture of claim C.14., in which the mobile gaming device is a hands-free device.

C.15. The article of manufacture of claim C, in which transmitting the electronic tax form and transmitting the electronic authorization are performed on behalf of the player. C.15.1. The article of manufacture of claim C.15, in which a prompt is transmitted to the player, in which the prompt requests the player's approval before transmitting the electronic tax form and transmitting the electronic authorization. C.15.2. The article of manufacture of claim C.15, in which the electronic tax form and the electronic authorization are transmitted automatically without the player's input.

C.16. The article of manufacture of claim C, in which the tangible, non-transitory computer-readable medium stores instructions which, when executed by the processor, direct the processor to: transmit a notification to the player that the tax submission has been transmitted. C.17. The article of manufacture of claim C, in which the tangible, non-transitory computer-readable medium stores instructions which, when executed by the processor, direct the processor to: award the player with a payout that comprises the player's winnings less the tax liability. C.17.1. The article of manufacture of claim C.17., in which the tangible, non-transitory computer-readable medium stores instructions which, when executed by the processor, direct the processor to: store the player's winnings as credits. C.17.1.1. The article of manufacture of claim C.17.1., in which the credits are redeemable for playing future games. C.17.1.2. The article of manufacture of claim C.17.1., in which the credits are converted into cash. C.17.2. The article of manufacture of claim C.17., in which the tangible, non-transitory computer-readable medium stores instructions which, when executed by the processor, direct the processor to: print a voucher that is redeemable at a cashier location in an amount of the player's winnings.

C.18. The article of manufacture of claim C, in which the tangible, non-transitory computer-readable medium stores instructions which, when executed by the processor, direct the processor to: receive a request to modify the electronic authorization from the player. C.18.1. The article of manufacture of claim C.18, in which the request to modify further comprises: canceling the electronic authorization for the game. C.18.2. The article of manufacture of claim C.18, in which the request to modify further comprises: adjusting a period of time in which the electronic authorization is valid. C.18.3. The article of manufacture of claim C.18, in which the request to modify further comprises: adjusting a quantity of games in which the electronic authorization is valid. C.18.4. The article of manufacture of claim C.18, in which the request to modify further comprises: adjusting a quantity of tax submissions in which the electronic authorization is valid. C.18.5. The article of manufacture of claim C.18, in which the request to modify further comprises: adjusting a maximum tax liability amount in which the electronic authorization is valid. C.18.6. The article of manufacture of claim C.18., in which the request to modify further comprises: adjusting a type of game that the electronic authorization is valid.

C.19. The article of manufacture of claim C, in which the tangible, non-transitory computer-readable medium stores instructions which, when executed by the processor, direct the processor to: determine that the electronic authorization is no longer valid. C.19.1. The article of manufacture of claim C.19, in which the tangible, non-transitory computer-readable medium stores instructions which, when executed by the processor, direct the processor to: transmit an indication to the player that the electronic authorization is no longer valid. C.19.1.1. The article of manufacture of claim C.19.1., in which the tangible, non-transitory computer-readable medium stores instructions which, when executed by the processor, direct the processor to: receive an updated electronic authorization from the player. C.19.2. The article of manufacture of claim C.19, in which the tangible, non-transitory computer-readable medium stores instructions which, when executed by the processor, direct the processor to: transmit a request for the player to submit an updated electronic authorization. C.19.2.1. The article of manufacture of claim C.19.2., in which the tangible, non-transitory computer-readable medium stores instructions which, when executed by the processor, direct the processor to: receive an updated electronic authorization from the player.

C.20. The article of manufacture of claim C, in which the tangible, non-transitory computer-readable medium stores instructions which, when executed by the processor, direct the processor to: verify that the electronic tax form is up-to-date. C.21. The article of manufacture of claim C, in which the tangible, non-transitory computer-readable medium stores instructions which, when executed by the processor, direct the processor to: update the electronic tax form to reflect any changes within the at least one jurisdiction. C.22. The article of manufacture of claim C, in which the tax submission to transmitted to a tax authority that corresponds to the at least one jurisdiction.

D. A method for submitting a tax submission on behalf of a player of a game, the method comprising: receiving a request from the player to play the game on a gaming device;

determining an identity of the player and a location of the gaming device; based on the location of the gaming device, determining at least one jurisdiction that governs the player's taxable winnings; requesting that the player fill out an electronic tax form for each jurisdiction; obtaining an electronic authorization from the player; transmitting the electronic tax form to be stored on a remote database; determining, based on the player's winnings, that the player has a tax liability; retrieving, in response to the tax liability, the electronic tax form and the electronic authorization for the player from the remote database; and transmitting the he electronic tax form and the electronic authorization to a tax authority that governs the at least one jurisdiction.

D. A method for submitting a tax submission on behalf of a player, the method comprising: receiving, via a gaming device, a request from the player to play a game; determining, via the gaming device, an identity and a location of the player; based on the location of the player, determining at least one jurisdiction that governs the player's taxable winnings; requesting that the player fill out at least one electronic tax form for each jurisdiction; obtaining an electronic authorization from the player; transmitting the at least one electronic tax form and the electronic authorization to be stored on a remote database, in which the remote database and the gaming device are in electronic communication over a network; determining, based on the player's winnings, that the player has a tax liability; retrieving, in response to the tax liability, the electronic tax form and the electronic authorization for the player from the remote database; and transmitting the he electronic tax form and the electronic authorization to a tax authority that governs the at least one jurisdiction. D.1. The method of claim D, in which the gaming device is a mobile device. D.2. The method of claim D, in which the gaming device is a wearable mobile device.

Computing

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., one or more computer programs, one or more scripts.

The term "compute" shall mean to determine using a processor in accordance with a software algorithm.

A "processor" means one or more microprocessors, central processing units (CPUs), computing devices, microcontrollers, digital signal processors, graphics processing units (GPUs) or like devices or any combination thereof, regardless of the architecture (e.g., chip-level multiprocessing or multi-core, RISC, CISC, Microprocessor without Interlocked Pipeline Stages, pipelining configuration, simultaneous multithreading, microprocessor with integrated graphics processing unit, GPGPU).

A "computing device" means one or more microprocessors, central processing units (CPUs), computing devices, microcontrollers, digital signal processors, graphics card, mobile gaming device, or like devices or any combination thereof, regardless of the architecture (e.g., chip-level multiprocessing or multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process. For example, a description of a process is a description of an apparatus comprising a processor and memory that stores a program comprising instructions that, when executed by the processor, direct the processor to perform the method.

The apparatus that performs the process can include a plurality of computing devices that work together to perform the process. Some of the computing devices may work together to perform each step of a process, may work on separate steps of a process, may provide underlying services that other computing devices that may facilitate the performance of the process. Such computing devices may act under instruction of a centralized authority. In another embodiment, such computing devices may act without instruction of a centralized authority. Some examples of apparatus that may operate in some or all of these ways may include grid computer systems, cloud computer systems, peer-to-peer computer systems, computer systems configured to provide software as a service, and so on. For example, the apparatus may comprise a computer system that executes the bulk of its processing load on a remote server, but outputs display information to and receives user input information from a local user computer, such as a computer system that executes VMware software.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves, and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

The term "tangible computer-readable medium" refers to a "computer-readable medium" that comprises a hardware component, such as optical or magnetic disks.

Various forms of computer readable media may be involved in carrying data (e.g., sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), wireless local area network communication defined by the IEEE 802.11 specifications whether or not they are approved by the Wi-Fi Alliance, SAP, ATP, Bluetooth, and TCP/IP, TDMA, CDMA, and 3G; and/or (iv) encrypted to ensure privacy or prevent fraud in any of a variety of ways well known in the art.

The term "database" refers to any electronically-stored collection of data that is stored in a retrievable format.

The term "data structure" refers to a database in a hardware machine such as a computer.

The term "network" means a series of points or nodes interconnected by communication paths. For example, a network can include a plurality of computers or communication devices interconnected by one or more wired and/or wireless communication paths. Networks can interconnect with other networks and contain subnetworks.

The term "predetermined" means determined beforehand, e.g., before a present time or a present action. For example, the phrase "displaying a predetermined value" means displaying a value that was determined before the act of displaying.

The term "condition" means (1) a premise upon which the fulfillment of an agreement depends, or (2) something essential to the appearance or occurrence of something else.

The term "transaction" means (1) an exchange or transfer of goods, services, or funds, or (2) a communicative action or activity involving two parties or things that reciprocally affect or influence each other.

Thus a description of a process is likewise a description of a computer-readable medium storing a program for performing the process. The computer-readable medium can store (in any appropriate format) those program elements which are appropriate to perform the method. For example, a description of a process is a description of a computer-readable storage medium that stores a program comprising instructions that, when executed by a processor, direct the processor to perform the method.

Just as the description of various steps in a process does not indicate that all the described steps are required, embodiments of an apparatus include a computer or computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g., the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel®, Pentium®, or Centrino™, Atom™ or Core™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

As used herein, the term "encryption" refers to a process for obscuring or hiding information so that the information is not readily understandable without special knowledge. The process of encryption may transform raw information, called plaintext, into encrypted information. The encrypted information may be called ciphertext, and the algorithm for transforming the plaintext into ciphertext may be referred to as a cipher. A cipher may also be used for performing the reverse operation of converting the ciphertext back into plaintext. Examples of ciphers include substitution ciphers, transposition ciphers, and ciphers implemented using rotor machines.

In various encryption methods, ciphers may require a supplementary piece of information called a key. A key may consist, for example, of a string of bits. A key may be used in conjunction with a cipher to encrypt plaintext. A key may also be used in conjunction with a cipher to decrypt ciphertext. In a category of ciphers called symmetric key algorithms (e.g., private-key cryptography), the same key is used for both encryption and decryption. The sanctity of the encrypted information may thus depend on the key being kept secret. Examples of symmetric key algorithms are DES and AES. In a category of ciphers called asymmetric key algorithms (e.g., public-key cryptography), different keys are used for encryption and decryption. With an asymmetric key algorithm, any member of the public may use a first key (e.g., a public key) to encrypt plaintext into ciphertext. However, only the holder of a second key (e.g., the private key) will be able to decrypt the ciphertext back into plaintext. An example of an asymmetric key algorithm is the RSA algorithm.

ALTERNATIVE TECHNOLOGIES

It will be understood that the technologies described herein for making, using, or practicing various embodiments are but a subset of the possible technologies that may be used for the same or similar purposes. The particular technologies described herein are not to be construed as limiting. Rather, various embodiments contemplate alternate technologies for making, using, or practicing various embodiments.

Modifications, additions, or omissions may be made to the method without departing from the scope of the invention. The method may include more, fewer, or other steps. Additionally, steps may be performed in any suitable order without departing from the scope of the invention.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the claims herein.

INCORPORATION BY REFERENCE

The following patents and patent applications are incorporated by reference herein for all purposes:

U.S. Pat. No. 8,210,931 (application Ser. No. 11/871,403); U.S. Pat. Nos. 6,579,181; 6,299,536; 6,093,103; 5,941,769; 7,114,718; US patent application publication 20050012269; U.S. Pat. Nos. 4,515,367; 5,000,453; 7,137,630; 7,137,629

The invention claimed is:

1. A method for submitting a tax submission on behalf of a player of a game, the method comprising:

receiving, by at least one processor, a request from the player to play the game on a gaming device and a pin or an electronic signature for authorization;

determining, by at least one processor, an identity of the player and a location of the gaming device;

determining, by at least one processor, whether the player has an authorization profile;

based on the location of the gaming device, determining at least one jurisdiction that governs taxable winnings of the player;

determining, by at least one processor, based on the taxable winnings, that the player has a tax liability when the player hits a taxable event; and automatically recording, by at least one processor, in a memory the taxable event with the pin or the electronic signature;

in response to the tax liability, transmitting, by at least one processor, the tax submission to a remote device, in which the tax submission comprises at least an electronic tax form and the authorization, in which the remote device and the at least one processor are in electronic communication over a network.

2. The method of claim 1, further comprising:

receiving, by the at least one processor, an indication that the authorization is valid for a period of time.

3. The method of claim 2, further comprising:

transmitting, by the at least one processor, a request to re-authorize the player's pin or the electronic signature after the player has surpassed the period of time.

4. The method of claim 1, further comprising:

receiving, by the at least one processor, an indication that the authorization is valid for a quantity of games played by the player.

5. The method of claim 4, further comprising:

transmitting, by the at least one processor, a request to re-authorize the player's pin or the electronic signature after the player has surpassed the quantity of games.

6. The method of claim 1, further comprising:

receiving, by the at least one processor, an indication that the authorization is valid for a quantity of tax submissions from the player.

7. The method of claim 1, further comprising:

generating, by the at least one processor, the authorization profile for the player, in which the authorization profile comprises the authorization for at least one jurisdiction that is relevant to the player.

8. The method of claim 1, further comprising:

monitoring, by the at least one processor, an amount of winnings of the player for each game.

9. The method of claim 8, further comprising:

determining, by the at least one processor, whether the amount of winnings exceeds a taxable threshold for the at least one jurisdiction.

10. The method of claim 1, in which transmitting the electronic tax form and transmitting, by the at least one processor, the authorization are performed on behalf of the player.

11. The method of claim 1, further comprising:

generating, by the at least one processor, an indication of an award that comprises a payout with winnings less the tax liability.

* * * * *